Figure 4:
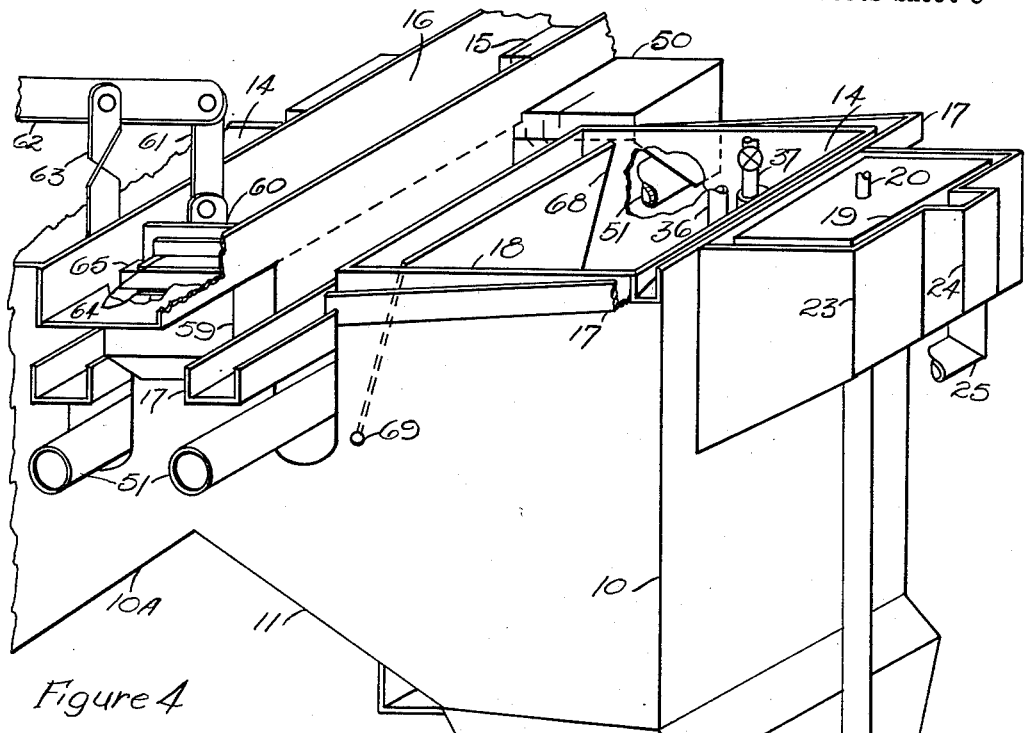

Feb. 12, 1963  E. P. THAMME  3,077,265
DISCHARGE CONTROLLED HYDRAULIC CLASSIFIER
Filed July 27, 1960  3 Sheets-Sheet 1
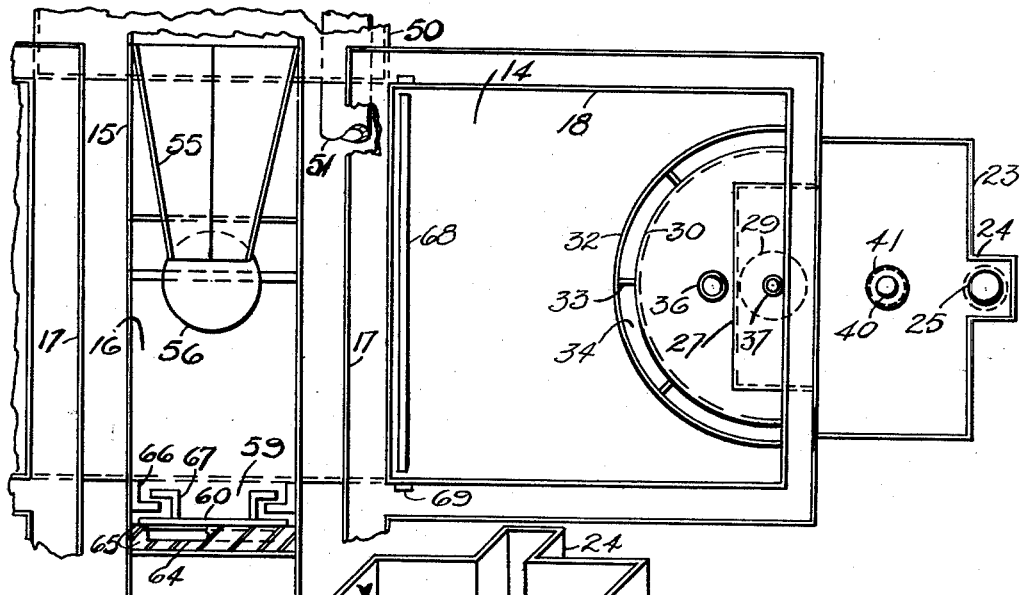
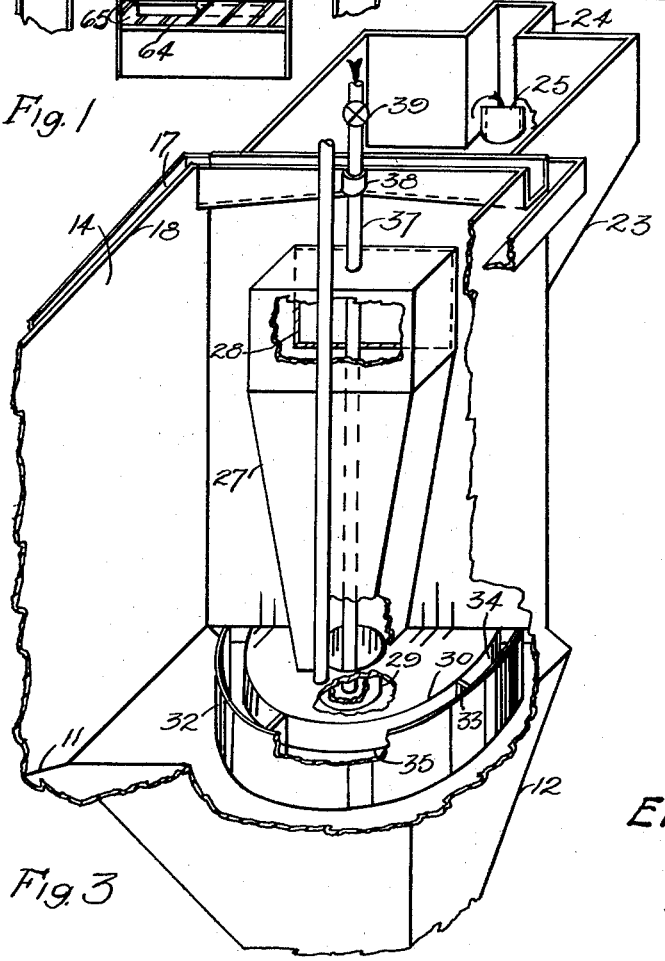
Fig. 1
Fig. 3
Eric P. Thamme
Inventor
By M. Bjorndal
Attorney.

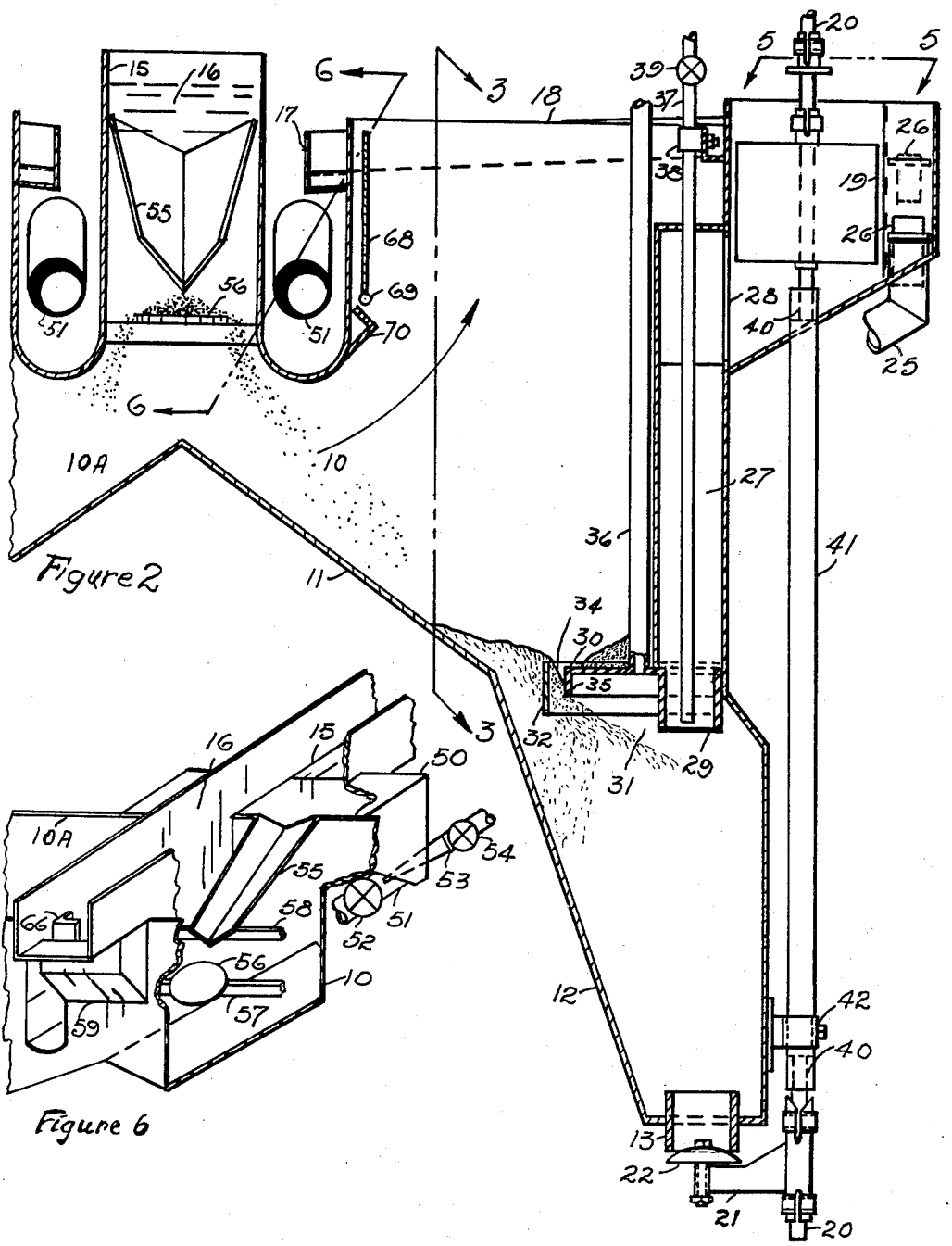

Eric P. Thamme
Inventor

United States Patent Office 3,077,265
Patented Feb. 12, 1963

3,077,265
DISCHARGE CONTROLLED HYDRAULIC
CLASSIFIER
Eric P. Thamme, 58 Clinton St., Farmingdale, N.Y.
Filed July 27, 1960, Ser. No. 45,757
10 Claims. (Cl. 209—158)

This application relates to classifiers such as used in the preparation of sand for building purposes, and also relates to improvements in discharge mechanisms of the float-actuated automatic type employed in connection therewith.

This invention also relates to my patents, Number 2,865,503 and Number 2,999,594 and differs from the latter by an improvement which realizes within limits a non-flushing discharge mechanism of the type disclosed therein, and differs from the former by increasing the range of useful application, as well as the efficiency of a sub-current type of classifier allowed in my patent.

Effective means of increasing the efficiency of a hydraulically classifying unit are inherent to conveying solids in a velocity reducing sub-current to provide free settling and hindered settling conditions in that order. A medium of suspension of diminishing density in the direction of flow is provided in which the lesser particles move upwardly and away from the larger particles and therefore interfere less with one another.

Vertically oriented currents of settling solids, rather than horizontally positioned and with classification interfering layers of specifically seized solids are brought about when suspended solids enter from below into a liquid column of vertically uniform cross-section, which is right-angled relative to the prior direction of the conveying sub-current.

A column of suspension of varying density exists operationally within a restricted passage appended to the lower portion of a control tank, from which water is draining simultaneously at variable rates. This control tank is located within the larger, slurry receiving receptacle, and communicates with a float tank located outside of said receptacle. The float positions under influence of a variably impeding material level which governs the control-water fluid-level and thereby the rate of underflow discharge. When operations are temporarily suspended, as during the lunch period, suspended particles settle into a plug-like obstruction.

These solids, or the larger portion thereof, will remain suspended when independently supplied water is conveyed at suitably low pressure through a vertically positioned small pipe to above the lower limit of and within said passage. In this manner a passage for liquid communication between settling tank and control tank or discharge mechanism is provided which cannot become obstructed.

The main object of my invention is to provide a variable velocity sub-current type of classifier of increased efficiency and greater usefulness, and in connection therewith to also provide an improved discharge mechanism of exceptional sensitivity for controlling the underflow from classifiers.

Another object of my invention is to provide an improved classifier that may be inexpensively manufactured, which is cheaply maintained, and which is convenient to operate.

Further objects and advantages of my invention will be apparent from the following description and claims.

Figure 5:
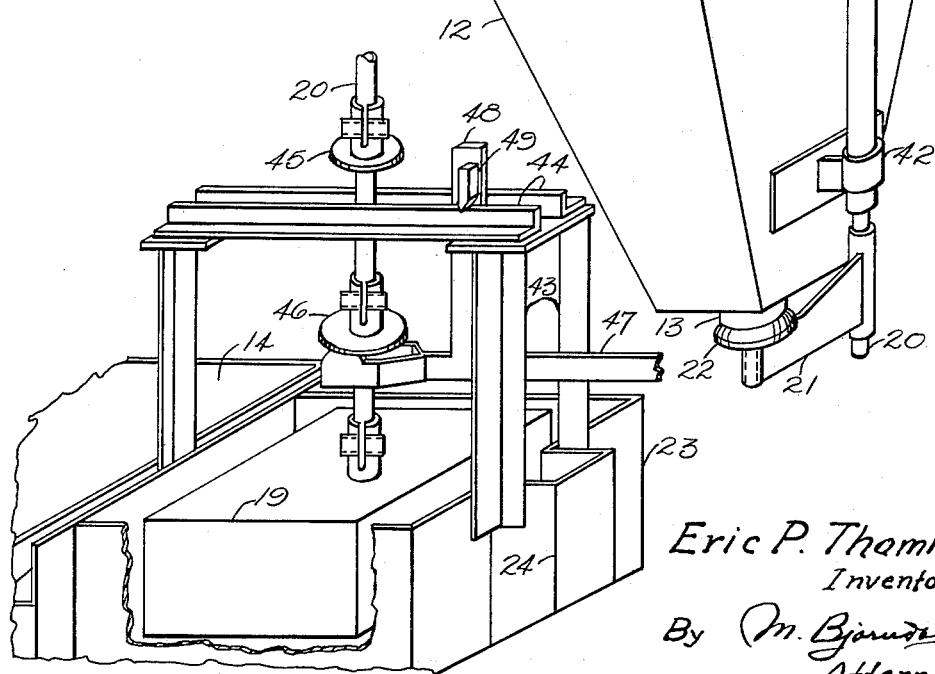

In the drawing forming a part of this specification and in which like numerals illustrate like parts throughout the same;

FIGURE 1 is a partial perspective view of the intake of a classifier embodying my invention, FIGURE 2 is a vertical sectional view along the center line in a classifier embodying my invention, FIGURE 3 is a vertical perspective, partially cutaway, inside view of the classifier shown in FIGURE 2, FIGURE 4 is an outside perspective elevation of the unit shown in FIGURE 2, FIGURE 5 is a partial perspective view of the float lifting and locking mechanism, FIGURE 6 is a perspective view of the classifier shown in FIGURE 2, In the drawings, wherein for purpose of illustration is shown a preferred embodiment of my invention, the numeral 10 designates a settling tank with sloping bottom 11, tank extension or discharge chamber 12, valved underflow outlet 13, and overflow outlet 14, see FIGURES 2, 3 and 4. The classifier shown in FIGURE 2 is a dual one having a complete left half 10A identical with 10. Feed enters into the tank through intake chute 15, and through inlet opening 16, overflow enters the troughs 17 over the weirs 18, which govern the fluid level in the settling tank 10.

Float 19 connects through rod 20 and cantilevered valve support 21 to valve 22, which seats against the lower face of outlet 13. To float chamber 23 is appended extension 24 from which a drain 25 leads to the atmosphere. Drain pipe-insert 26, see FIGURE 2, is removably seated within and against the upper edge of drain pipe 25, which is welded to the bottom of chambers 23 and 24. This construction permits varying the elevation of the control water level when so desired, and permits also of sufficiently varying the rate of maximum discharge by using a smaller pipe for insert 26. Float chamber 23 see FIGURES 2 and 3, located outside of the settling tank 10, and control chamber 27 located within the settling tank and against its most distant wall, communicate with each other through the opening 28 in said wall. Control chamber 27 extends down to the discharge chamber 12, where it ends in conduit 29 which alone provides liquid communication with the settling tank 10. Umbrella 30, which is positioned relative to the lower limit of conduit or riser 29, provides space 31. A cylindrical open-ended baffle 32, co-axial with said umbrella and spacers 33 provide passage 34 in connection with said umbrella and skirting 35 which extends the umbrella downwardly. Space 31 is vented by pipe 36. Pipe 37, permits the introduction of auxiliary water through valve 39. This auxiliary water maintains an independently existing auxiliary column of suspension.

Inserted seals 40, see FIGURE 2, at the ends of pipe 41 form bearings and guides for the valve control 20, through which same can be moved up and down thus operating the valve element 22. Pipe 41 is welded in the sloping bottom of the float chamber 23 and is secured by bracket 42 to the outer wall of the discharge chamber 12. A structure consisting of angle irons 43, see FIGURE 5, with cross beams 44 is supported on top of the float tank 23. The valve rod 20 extends up through this structure and is supplied with an adjustable stop plate 45 which will limit its downward motion when it rests against the cross beams 44. A second circular stop plate 46 is fastened to the valve rod 20 inside of the structure formed by said angle irons. A valve lifting lever 47 is hung between the two cross beams by means of the member 48 and the cross pin 49 engageable to said stop plate 46 in such manner that by pushing down on the end of lever 47 the valve 22 may be permanently closed against the circular valve seat 13.

FIGURES 1 to 6 illustrate just one side 10 of a dual unit. The other side 10A is extended to the left and is cut off in these figures to permit illustration in reasonably large scale. The left hand unit is identical to the right hand unit. It has another control chamber, float chamber, discharge chamber and discharge valve exactly like the unit illustrated. The left hand unit also has a semi-circular umbrella 30 with vent 36, surrounding skirt 32, and auxiliary water pipe 37, the same as the right hand unit. It is obvious to one skilled in the art that these units may be built either single or double, but the double unit is more efficient in operation and costs less to produce in relation to its capacity.

In FIGURES 2, 4, 6 and 8 is illustrated how the intake chute is preferentially arranged for carrying the mixture of sand and water into the machine. Slurry enters through the chute 15, fills and overflows the trap 50 mounted below the chute 15 and against the settling tank 10, and having outlet pipes 51, as well as auxiliary water intake pipes 53, and the valves 52 and 54 respectively, see FIGURE 6. The purpose of this trap is to convey any desired fraction of the total solids flow to a separate unit when such is desired, and to overflow solids by the tapered and slanting chute 55, onto the horizontally positioned table 56 for better distribution and preliminary separation. The lesser solids remain suspended in the water above the chute as they enter from the trap into the tank. Table 56 is supported by cross-piece 57; cross-member 58 supports chute 55 near its free end.

At the downstream side of the settling tank 10 and 10A see FIGURE 4, chute 15 is downwardly extended into well 59 which houses the adjustable weir 60. Same may be raised or lowered by means of link 61, lever 62, and support 63. By means of this weir the head under which the tank may be working is regulated. On the outer side of the weir-gate 60 upper and lower angle-iron 64 support seal 65 between them. This seal, and such sand as will collect above it, prevents the escaping of water from the tanks. Below the seal a sloping bottom makes the well self-clearing. Angle irons 66 see FIGURE 1 welded to the inner sides of the weir-well 59, and angle-irons 67 welded to the weir-gate 60, function as guides for the latter. Weir 60 may be lowered to a point where its upper edge is lower than the bottom of the inclining intake chute 15.

An additional regulatory device is provided by the hinged plate 68, which is rotatable around the stationary rod 69 which is welded to the outer sides of the settling tank. With the plate 68 in the vertical position as shown in FIGURE 2, the liquid column discharging through the top opening is of uniform cross-section throughout the vertical height of plate 68. When this plate is adjusted to an angle as shown in FIGURE 4 increasing effluent velocities prevent the accumulation of solids whose settling rate corresponds exactly to the otherwise uniform effluent velocity of the ascending column of liquid. Means of securing the plate in postion are obvious and are not shown. Angle iron 70 suitably diverts the flow of water; it is welded to the sides of tank 10. Overflow from one unit may be fed to an adjacent one, or other units, for purposes of re-classifying said overflow.

The operation of my invention is as follows:

Prior to the start of plant operations, the outlet valves 22 are manually closed by pushing down on lever 47 and locking same in place by suitable means such as a piece of wood placed between same and the cross beams 44. Before being charged with sand, classifiers are customarily filled up with water only until it overflows. When water overflows the edge of the settling tank 10 it will also drain through pipe 25. The rate of discharge through drain pipe 25 is very small in comparison with the input rate. It is possible, after a few trials, to adjust in advance for the desired rate of response by selecting an exchangeable insert 26 of suitable height and opening size.

Solids conveyed by the water-flow coming through the chute 15 may be withdrawn at desired rates through the trap 50 and through pipes 51 to another unit for processing. A degree of control over the solid percentage of the feed entering either unit accrues thereby and provides an operational advantage. If this is not desired, the valve 52 is closed and all the solids will follow the water and enter the settling tank, the bulk of solids flowing down over chute 55. The heavier particles settle at once; lighter ones are carried varied distances by the current before they escape into a body of quiescent water below said current. The lighter solids enter into an ascending column of liquid, the velocity of which governs the size of particle to be overflowed and which therefore is critical. The effective range of this critical velocity normally extends throughout the vertical height of an ascending liquid column. This normal range is very materially reduced when increasing velocities prevail from just above the lower limit of said column of liquid instead of one uniform velocity. Suspended solids unable to escape downwardly are elevated out of the way and are prevented from accumulating in the course of time into a horizontally positioned and with classification interfering barrier.

Effluent velocities are related to input rates and may be high or low, as desired. The only adjustment needed to vary the size of the overflowing particle within limits, of course, is to raise or lower weir 60, which changes the speed of flow through the settling tank. Except for removing the piece of wood described as locking the discharge valve the operation is automatic. As sand collects, a rising material level blocks the free flow of water as indicated in FIGURE 2. Simultaneously water drains off through drain 25 which communicates with the settling tank 10 through riser 29, through control chamber 27, and through float chamber 23. The float 19 positions relative to the fluid level in chamber 23 and opens valve 22 under influence of a variably impeding material level. It has been found by experience that the discharge mechanism provides a stabilized valve when stable conditions and a reasonable rate of feed prevail. Otherwise, a very mobile valve evidences a sensitive discharge mechanism.

To prevent clogging up of the riser 29 into which solids settle when little or no water passes through the sand seal about the umbrella 30 for a lengthly period of time, auxiliary water is introduced through the pipe 37. This independently supplied water maintains an auxiliary column of suspension within the larger and operatively existing column of suspension within riser 29 and control chamber 27. A pasasge for liquid communication between settling tank 10 and float chamber 23 is naturally provided which is never obstructed. Once determined that a given rate of auxiliary water is adequate to accomplish the intended purpose, additional adjustments are not needed. In general the machine operates automatically and requires very little attention.

It is to be understood that the form of my invention, herewith shown and described, is to be taken as a preferred example of same and that various changes in the shape, size and arrangement of parts may be resorted to, without departing from the spirit of my invention or the scope of the subjoined claims.

Having thus described my invention, I claim:

1. In a sand classifier the combination of an intake chute carrying a mixture of sand and water; an adjustable weir in said chute; a settling tank connected to said chute; a trap located in said intake chute at the entrance of said settling tank; an outlet chamber tapering from the sides of said settling tank; a fixed, vented umbrella covering the largest part of the passage between said outlet chamber and said settling tank; a skirt in the form of a semi-cylindrical vertical pipe section surrounding said umbrella; a float chamber located on the outer side of said settling tank and above said outlet chamber; a float in said float chamber; a vertically positioned control chamber communicating from said float chamber to the space underneath said umbrella; an adjustable drain placed in the bottom of said float chamber; and outlet valve located in the bottom of said outlet chamber; and a valve stem connecting said outlet valve to said float in said float chamber.

2. In a classifier the combination of an intake chute carrying a mixture of finely divided solids and water; a settling tank connected to said intake chute; an adjustable weir located in line with and opposite to said intake chute on the far side of said settling tank; a trap located in said chute ahead of the settling tank; said trap having a downwardly slanting extension terminating within said settling tank; said tank having an upper overflow outlet, a sloping bottom, and a tapering outlet chamber; an outlet valve located in the bottom of said outlet chamber; a downwardly tapering control chamber located against one side of said tank; a float chamber communicating with said control chamber, said float chamber being positioned on one side of said control chamber; adjustable drain means placed in said float chamber; a conduit leading from the control chamber bottom into the tank and providing liquid communication therewith; a vented umbrella above the lower limit of said conduit, which co-acting with material accumulated in the settling tank variably restricts flow through said conduit, and through a column of suspension within said control chamber and said conduit; an auxiliary water pipe having an adjustable valve entering said control chamber and terminating above the lower limit of said conduit and providing an auxiliary column of suspension; a semi-cylindrical, vertical, and open-ended skirt surrounding said umbrella at a spaced distance from same; a float located in float chamber; fixed, tubular, and sealed means extending downwardly from said float tank vertically and outside of said settling tank to a point adjacent to said valved outlet; a valve stem connecting said float to a valve closing the valved outlet and slideably movable in said vertical tubular means; whereby operation of the valve is effected by variation of level in the float chamber, and an adjustable stop and closing mechanism engaging said valve stem on top of said float chamber.

3. In a sand classifier such as described in claim 2 in which said trap is connected to a plurality of valved pipes, said trap having co-axially located pipes conducting auxiliary water entering said trap opposite to the end of said connecting pipes inside said trap.

4. A sand classifier such as described in claim 2 except that each such classifier is made up of a dual settling tank and having identical but separate control chambers, discharge chambers and valves.

5. A sand classifier such as described in claim 2 in which said settling tank is provided with a gate, said gate being hinged in such fashion as to reduce the vertical cross-sectional area of the effluent liquid column.

6. A sand classifier such as described in claim 2 where said valve stem has an adjustable arm fastened to its lower end, said arm extending to said valve element and supporting same.

7. In a classifier the combination of an intake chute carrying a mixture of sand and water; a settling tank communicating with said intake chute through an inlet opening below water level; said settling tank comprising an overflow chamber, a valved outlet chamber, and a sloping bottom; said overflow chamber, outlet chamber and sloping bottom in operative conjunction with said inlet opening providing a zone of increasing cross-sectional area through which a fluid current is maintained automatically at a reasonably constant level; a float chamber located on the outer side of said settling tank; a vertical duct communicating between said float chamber and said settling tank; a vented umbrella connected to said vertical duct and positioned at the approximate juncture of said outlet chamber and said sloping bottom; a skirt surrounding said umbrella and attached thereto; an outlet valve located in the bottom of said outlet chamber; a valve stem connecting said outlet valve with a float inside said float chamber, and drain means located on said float chamber.

8. A sand classifying machine for continuously separating sand, in accordance with the mass of the particles thereof, comprising in combination; a settling tank having side walls, a sloping bottom, an outlet chamber, and an inlet opening below water level; an intake chute disposed above said inlet opening and communicating with said settling tank; an adjustable weir located in said intake chute whereby the working head in said settling tank is controlled; a control chamber positioned within said settling tank, said control chamber having an upper closure and an open lower end; a vented umbrella located above said open lower end; an open-ended skirt positioned about said umbrella and located at the approximate juncture of said tank and outlet chamber; a metal duct connecting the lower end of said control chamber with said settling tank and outlet chamber; a water conduit carrying auxiliary water penetrating said control chamber and terminating inside same and just above the open lower end of said control chamber; a float chamber in communicative relation to said control chamber; a vertically moveable float located in said float chamber, said float chamber having an adjustable overflow drain whereby the water level in same may be adjusted; valve means at the bottom of said outlet chamber; means linking said float with said valve means, said linking means being located outside of said settling tank, whereby said valve means may be effectively controlled.

9. In a classifier the combination of an intake chute carrying a mixture of solids and water; a settling tank communicating with said intake chute through an inlet opening below water level; said settling tank comprising an overflow chamber, a valved outlet chamber, and a sloping bottom said overflow chamber having a hinged gate located at the approximate juncture of said inlet opening and the overflow chamber; said overflow chamber, outlet chamber, and sloping bottom in operative conjunction with said inlet opening providing a zone of increasing cross-sectional area through which a fluid passes conveying suspended solids; said overflow chamber in conjunction with said gate providing a zone of adjustably decreasing cross-sectional area through which a fluid passes at progressively increasing rates; a float chamber located on the outer side of said settling tank; a vertical duct communicating between said float chamber and said settling tank; said duct terminating in a restricting passage at its lower limit; a vented umbrella connected to said vertical duct relative to the lower limit of said restricting passage, and positioned at the approximate juncture of said outlet chamber and said sloping bottom; a skirt surrounding said umbrella and attached thereto; an outlet valve located in the bottom of said outlet chamber; a tubular valve stem connecting said outlet valve with a float inside said float chamber, and drain means located on said float chamber.

10. In a classifier such as described in claim 2 where said trap is connected to and provides the upper limit of an open-ended, downwardly slanting chute; said chute terminating below water level at a pre-determined elevation, and providing passage for solids from said trap.

References Cited in the file of this patent

UNITED STATES PATENTS 1,637,625    Shaw                   Aug. 2, 1927
2,723,030    Drigenko             Nov. 8, 1955